US008629668B2

(12) United States Patent  
Menegoli et al.

(10) Patent No.: US 8,629,668 B2
(45) Date of Patent: Jan. 14, 2014

(54) MULTI-PHASE SYNTHETIC RIPPLE POWER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 141 days.

(21) Appl. No.: 13/200,049

(22) Filed: Sep. 19, 2011

(65) Prior Publication Data

US 2013/0069611 A1 Mar. 21, 2013

(51) Int. Cl.
*H02M 3/158* (2006.01)
(52) U.S. Cl.
USPC ............................ 323/284; 323/285; 323/272
(58) Field of Classification Search
USPC .................................. 323/282, 283, 284, 285
See application file for complete search history.

(56) References Cited

U.S. PATENT DOCUMENTS

| 5,847,554 | A | 12/1998 | Wilcox et al. |
| 5,982,160 | A | 11/1999 | Walters et al. |
| 6,160,388 | A | 12/2000 | Skelton et al. |
| 6,441,597 | B1 | 8/2002 | Lethellier |
| 6,495,995 | B2 | 12/2002 | Groom et al. |
| 6,806,689 | B2 * | 10/2004 | Schuellein et al. ........... 323/272 |
| 7,301,314 | B2 | 11/2007 | Schuellein et al. |
| 7,301,317 | B1 | 11/2007 | Mattingly |
| 7,466,116 | B2 * | 12/2008 | Sato et al. .................... 323/285 |
| 7,479,772 | B2 | 1/2009 | Zane et al. |
| 7,541,794 | B2 * | 6/2009 | Tabaian et al. ............... 323/284 |
| 2006/0113979 | A1 * | 6/2006 | Ishigaki et al. ............... 323/282 |
| 2009/0121695 | A1 * | 5/2009 | Pierson et al. ............... 323/283 |
| 2011/0043317 | A1 * | 2/2011 | Ikriannikov .................. 336/192 |

* cited by examiner

*Primary Examiner* — Gary L Laxton
*Assistant Examiner* — Trinh Dang

(57) ABSTRACT

A novel method to operate synthetic ripple multi-phase switching power converters at constant frequency is presented. The method includes the means for sensing the current in each phase without adding extra dissipation and for balancing the currents by affecting the synthetic ripple signal to modulate the duty cycle without disturbing the overall output voltage regulation.

Furthermore a method for obtaining optimum load transient response is presented. The method includes the means for simply determining the derivative of the synthetic ripple signal and for forcing maximum duty cycle until the derivative of the synthetic ripple signal reaches a certain threshold. A variant of this method improves further the load transient response by coupling an RC network to the ramp signal generated to modulate the duty cycle so as to maintain the maximum duty cycle a bit longer after the derivative of the synthetic ripple signal has reached the zero value.

20 Claims, 10 Drawing Sheets

MULTI-PHASE SYNTHETIC RIPPLE POWER CONVERTER

BACKGROUND OF THE INVENTION

1. Field of the Invention

The present invention is in the field of power converters. The present invention is further in the field of semiconductor switching power converters. The present invention further relates to the field of integrated synthetic ripple control methods for switching power converters and circuits. The present invention is further in the field of integrated switching power converters. The present invention is further in the field of hysteretic control types for switching power converters. The present invention is further in the field of multi-phase switching power converters. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. Switching power converters comprise isolated and non isolated topologies. The galvanic isolation is generally provided by the utilization of transformers. Although the subject invention is mainly focused on non isolated switching power converters, it may refer in part to isolated power converters as well.

Modern switching power converters are in general divided in step down power converters, also commonly known as "buck converters", and step up power converters commonly known as "boost converters". This definition stems from the ability of the converter to generate regulated output voltages that are lower or higher than the input voltage regardless of the load applied.

One class of modern switching power converters implemented in integrated circuits is the one comprising hysteretic control or pseudo-hysteretic control where a synthetic ripple signal is generated and compared to a reference to determine the duty cycle of the switching period in order to regulate the output voltage at the desired level. These hysteretic power converters do not include an error amplifier, a specific compensation network or a periodic signal to determine the switching frequency.

In fact their switching frequency is determined by several factors like the input voltage, the output voltage, the load, the output capacitor value, the inductor value, the hysteresis value, and the general propagation delays of the feedback network, of the comparator, of the driver, and of the output stage. However frequency control circuits are commonly implemented in order to control the frequency.

For high load current applications it is not uncommon to use multi-phase converters which are viewed as a number of power converters to effectively operate in parallel in order to provide higher currents. The advantages of multi-phase switching converters are their higher power density, their lower current ripple for the same output capacitor, their superior transient response and their cost effectiveness for high current loads. Furthermore the efficiency of the power conversion is better optimized over the full range of loads because at light loads some phases of the converters may be completely turned off to reduce the switching losses.

The phases of the converter have to be switched out of phase with respect to each other in order to reduce the supply and ground voltage ripple and noise. This can be obtained in several ways, but the greatest simplification comes from having fixed frequency types of control because the misalignment of the switching phases is more easily obtained. Although the hysteretic type of control offers several advantages in terms of load transient response, the control of the switching frequency is not always the easiest.

Therefore since the fixed frequency ripple switching converters offer similar responsiveness, bandwidth, fast switching frequency and they operate at known and fixed frequency they are very good candidates for multi-phase operation. One of the problems of the multi-phase switching power converters is that the load current tends to spread unevenly in the phases especially when the load current is high. This represents a major issue because the advantages of multi-phase converters vanish if most of the current flows in one or two phases and, in addition, reliability problems arise if currents higher than expected flow for long times in one phase.

The reasons for the current unbalance are the unavoidable mismatch in the main inductors' series resistance, the mismatch of the on-resistance of the power devices, and errors and offsets in computing the duty cycle for each phase. Many configurations for controlling the multi-phase power converter exist and the main two configurations involve either having one controller for all the phases or many individual controllers, where each one controls one phase. The case of individual controllers, although only apparently more onerous, eliminates the possible error due to the duty cycle computing.

Many techniques to achieve current balance have been explored in the past and documented in prior art documents, however all include a first phase of sensing the current in each phase and subsequently a second phase of correcting the duty cycle to equalize the currents. The current sensing is mainly performed by either placing a small resistor in series to the inductor or by sensing the voltage drop on one of the power transistors when it is on. The first approach is more expensive and less efficient but more accurate.

Figure 1:
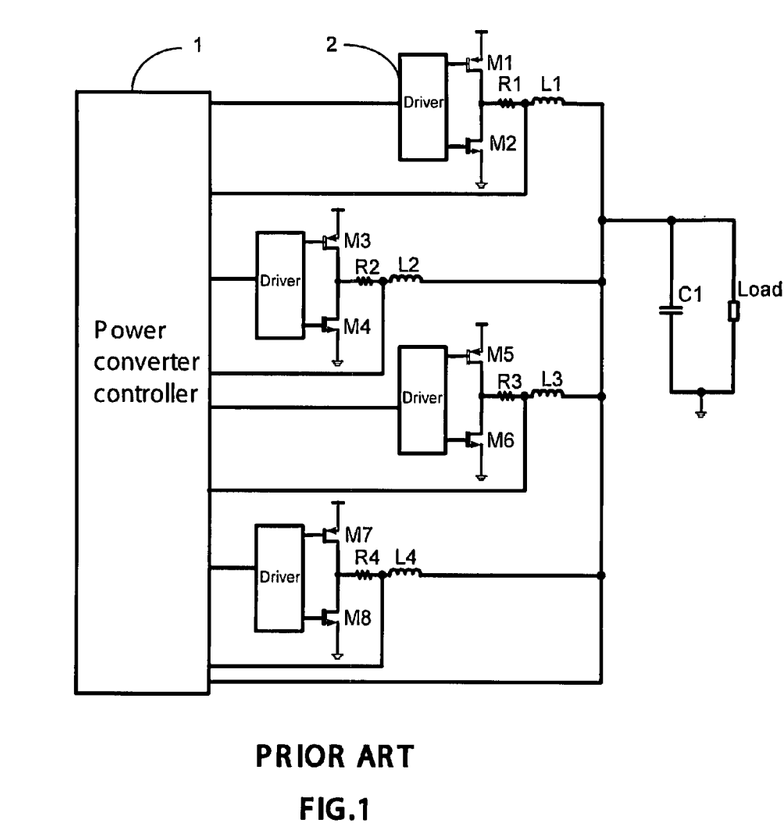
FIG. 1 shows a general multi-phase buck power converter topology with conventional general control circuit (prior art).

FIG. 1 depicts a typical prior art simplified block diagram of a four-phase buck converter with current sensing done by monitoring the voltage drop across series resistances. The sensing voltage at the nodes between the inductor and the resistor for each phase is fed to the power converter controller 1. The block 1 controls the synchronization of the switching for each phase, computes the current sensing information to determine the duty cycle correction for each phase and in general includes the output voltage control loop for regulation. The power converter controller feeds the driver blocks 2 with the driving signal to operate the power train.

The prior art Zane et al (U.S. Pat. No. 7,479,772) is an example of how complex current sharing can be for a multiphase converter. The current sensing information is passed to a controller to adjust the duty cycle of each phase maintaining the overall regulation of the output voltage and controlling the misalignment of the phases. In this case the information is digitalized adding to the complexity and limiting the bandwidth of the regulator. Wilcox et al (U.S. Pat. No. 5,847,554) is one of many examples of sensing the current for current sharing by checking the voltage drop of both power transistors when they are on, or the voltage drop of the low side power transistor during recirculation of the current.

The prior art patents Walters et al (U.S. Pat. No. 5,982,160) and Lethellier (U.S. Pat. No. 6,441,597) represent two examples of current sensing by measuring the voltage across the main capacitor of the feedback network or as a result of an RC time constant across the inductor, but if the series resistance of the inductor (ESR) is mismatched between phases, the current sensing through the RC is highly inaccurate. However for the cited cases of Walters and Lethellier the proposed technique does not make reference to multi-phase power converters.

Similarly Shuellein et al (U.S. Pat. No. 7,301,314) reports the same method for sensing the current in the phases of a multi-phase converter, but the same considerations of inaccuracies in presence of ESL mismatch apply. A clever technique is described in Sato et al (U.S. Pat. No. 7,466,116) where the current sensing is achieved by sensing the voltage drop across the bonding wire. This is quite interesting but today, in many applications (especially high frequency), the bonding wire cannot be used for their excessive intrinsic parasitic inductance and resistance. Furthermore the difficulty in checking the differential voltage may arise from the difficulty in having a good Kelvin connection of the true ground signal.

More interesting appears the approach taken by Skelton et al (U.S. Pat. No. 6,160,388). Skelton teaches a method to sense the current by monitoring the voltage drop across the low side power transistor when turned on and to hold the information into a capacitor. However the proposed circuitry to obtain this involves the utilization of operation amplifiers and switches limiting the bandwidth of the sensing and adding to the complexity of the system. It is worth mentioning that this was not intended for multi-phase current sharing.

An example of prior art of current balancing for multi-phase power converter is shown in Mattingly (U.S. Pat. No. 7,301,317) where an RC network in the multi-phase step down power converter is configured to program to desired power distribution between the phases. However, as mentioned above, this method is highly inaccurate and costly.

Another example of current balancing for multi phase power converters is described in Groom et al (U.S. Pat. No. 6,495,995). Groom teaches a method for sensing the current of a ripple multi-phase converter by using a series sense resistor and by trimming the duty cycle depending on an output of differential amplifier that senses one slave phase current with respect to a master signal. The unbalance also causes a differential voltage droop of the output that is corrected by the virtual ripple generator block. There is only one virtual ripple generation block for the whole power converter.

All the cited prior art does not describe a cost effective, accurate and simple method for achieving active current sharing in multi-phase switching power converters with optimum transient performance maintaining the system stability in all conditions. It is therefore a purpose of the present invention to describe a novel multi-phase switching power converter that combines the characteristic of simple adaptive adjusting of the duty cycle of each phase in order to obtain continuous current balance between the phases.

It is another purpose of the present invention to describe a power converter that can respond to abrupt and large load transients by forcing maximum duty cycle until the output current is equal or slightly higher than the load current so as to minimize the output voltage droop and recover from it in the shortest time possible. It is another purpose of the present invention to describe a constant frequency multi-phase ripple power converter that is stable and can operate at high switching frequencies.

SUMMARY OF THE INVENTION

It is an objective of the present invention to provide a multi-phase power converter that achieves active and continuous current balancing without affecting the output voltage regulation. It is another objective of the present invention to provide a multi-phase power converter that achieves current sharing between the phases with a novel means for sensing the current whose accuracy is independent on the mismatch of the on-resistance of the power devices.

It is another objective of the present invention to provide a simple circuit to adjust the duty cycle of each phase in order to obtain current balancing. It is another objective of the present invention to provide a method to obtain optimum load transient response for a step down power converter so as to minimize the voltage excursion with minimum output capacitor, maintaining a stable system in all the conditions.

The present invention describes a ripple multi-phase switching power converter that can be controlled as a hysteretic power converter or as a minimum off-time or minimum on-time fixed frequency power converter. In particular it describes a multi-phase power converter that achieves active current balancing. The current sensing is obtained in two possible ways. The first embodiment of the present invention shows the current sensing obtained by a simple sensing of the voltage drop across the low side power transistor when it is turned on.

Figure 2:
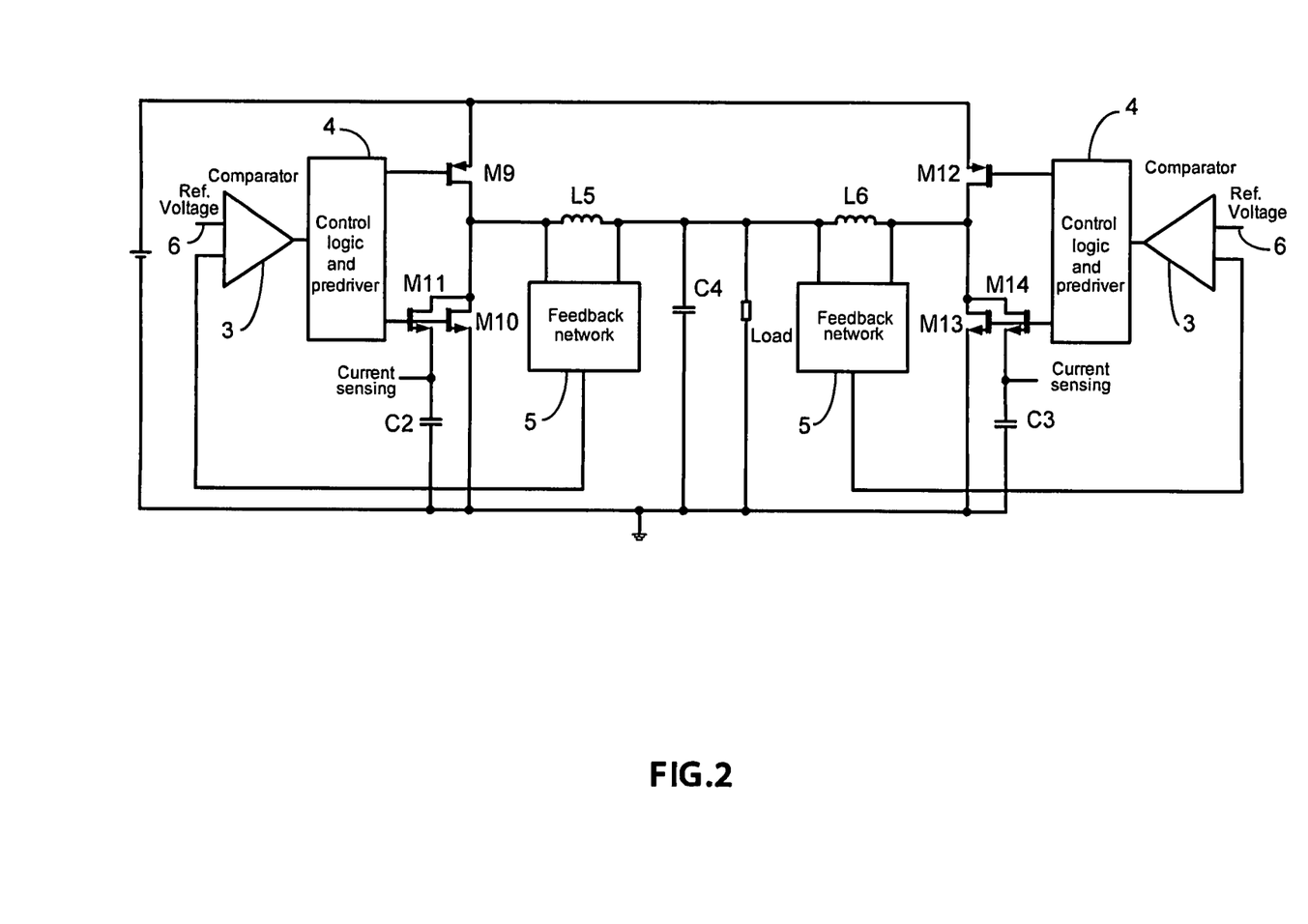
FIG. 2 shows the schematic of a dual phase hysteretic buck switching power converter according to a first embodiment of the present invention.

The circuit, as depicted in FIG. 2, shows a dual phase step down power converter, but the following references to describe the functions of the converter will focus for simplicity on one phase only implying that the same exact considerations will apply to the other phase as well. Similarly the circuit of FIG. 2 describes a dual phase power converter but similar considerations can be extended to multiple phase power converters with more than two phases. The power converter of FIG. 2 employs a hysteretic type of control and the feedback network 5 generates the synthetic ripple signal to be compared by the comparator 3 with a reference voltage at terminal 6.

The synthetic ripple signal is a signal replica of the output voltage ripple but it is amplified to make it more immune to switching noise. Typically the feedback network is constituted of passive elements but it could include transistors as well. The circuit shows a small switch M11 that is turned on at the same time that the main power device M10 is turned on. In reality, a small delay in turning on the transistor M11 with respect to the transistor M10 and a small delay in turning off M10 with respect to M11, are beneficial to prevent voltage spikes. The capacitor C2 holds the voltage till the next cycle.

It should be noted that the voltage across the capacitor C2 is proportional to the re-circulating current in the corresponding phase, but it does not necessarily represent the inductor current in an absolute and accurate way. However in order to obtain current sharing an absolute value of the current is not required, in fact what is needed is a consistent method to measure current with respect to the other phases of the power converter.

The presented method is simple and works quite well to correct current mismatches due to inductor series resistance mismatches, due to variations of duty cycle control between phases or even due to mismatches of the high side power transistor on-resistance, but it fails to balance the currents with accuracy in case of mismatches of the low side power transistor on-resistance. Additionally the on-resistance of the power transistor varies significantly with the temperature variations as well, even though for integrated devices the temperature of the die tends to be quite uniform with time so that the mismatch due to temperature gradient is not so pronounced or mainly present during temperature transients.

In fact if the on-resistances of the low side power transistors is not equal, since we infer the value of the current by sensing the voltage drop across the power device, any mismatch in the on-resistance will result in a mismatch in the phase currents.

Figure 3:
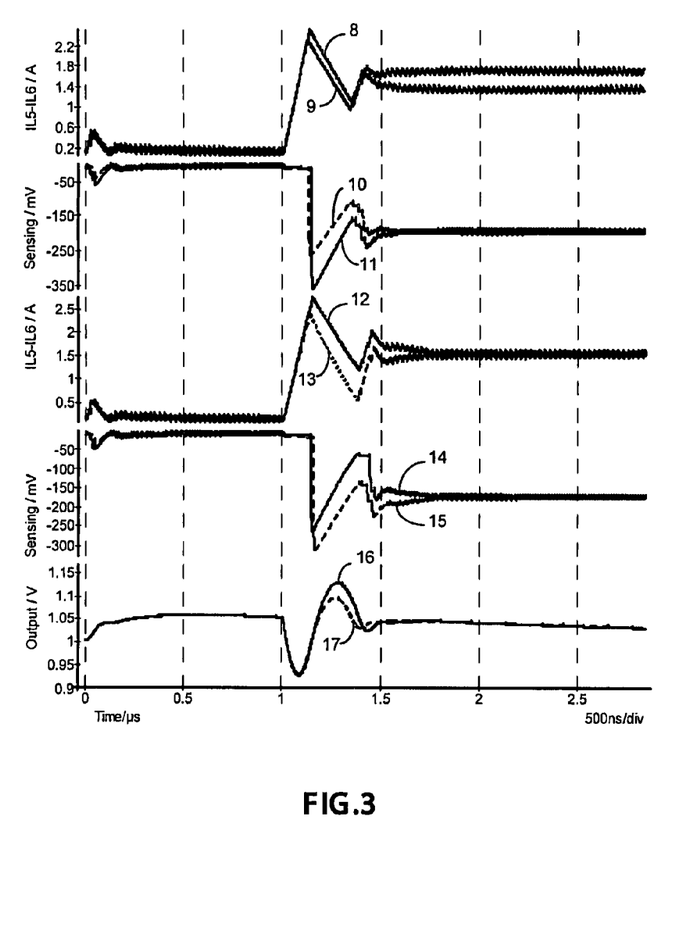
FIG. 3 shows the waveforms of the most significant voltages and currents as result of the circuit simulation of the dual phase buck converter of FIG. 2.

This is documented in FIG. 3 which shows the simulation results for the dual phase converter of FIG. 2 switching at 40 MHz for the cases of 20% mismatch in the low side power transistors on-resistances and for the case of zero series resistance for the inductor of phase 1 and 200 mΩ series resistance for the inductor of phase 2. In particular the waveforms 12 and 13 represent the phase currents for the case of ESR (Equivalent Series Resistance) mismatch of 200 mΩ for the inductors and it can be noted that about 1 us after the load transient (from a few mA to 3 A) the two currents are equalized. The waveforms 14 and 15 represent the sensing signals across the capacitors C2 and C3 of FIG. 2 in the same case.

The waveforms 8 and 9 represent the phase currents for the case of a 20% mismatch in the on-resistance of the low side power transistors. In this case it is noted that the two currents remain different since the sensing is affected by the error in on-resistance. The waveforms 10 and 11 represent the sensing signals for this case. The waveforms 16 and 17 represent the output voltage for the two cases.

Figure 4:
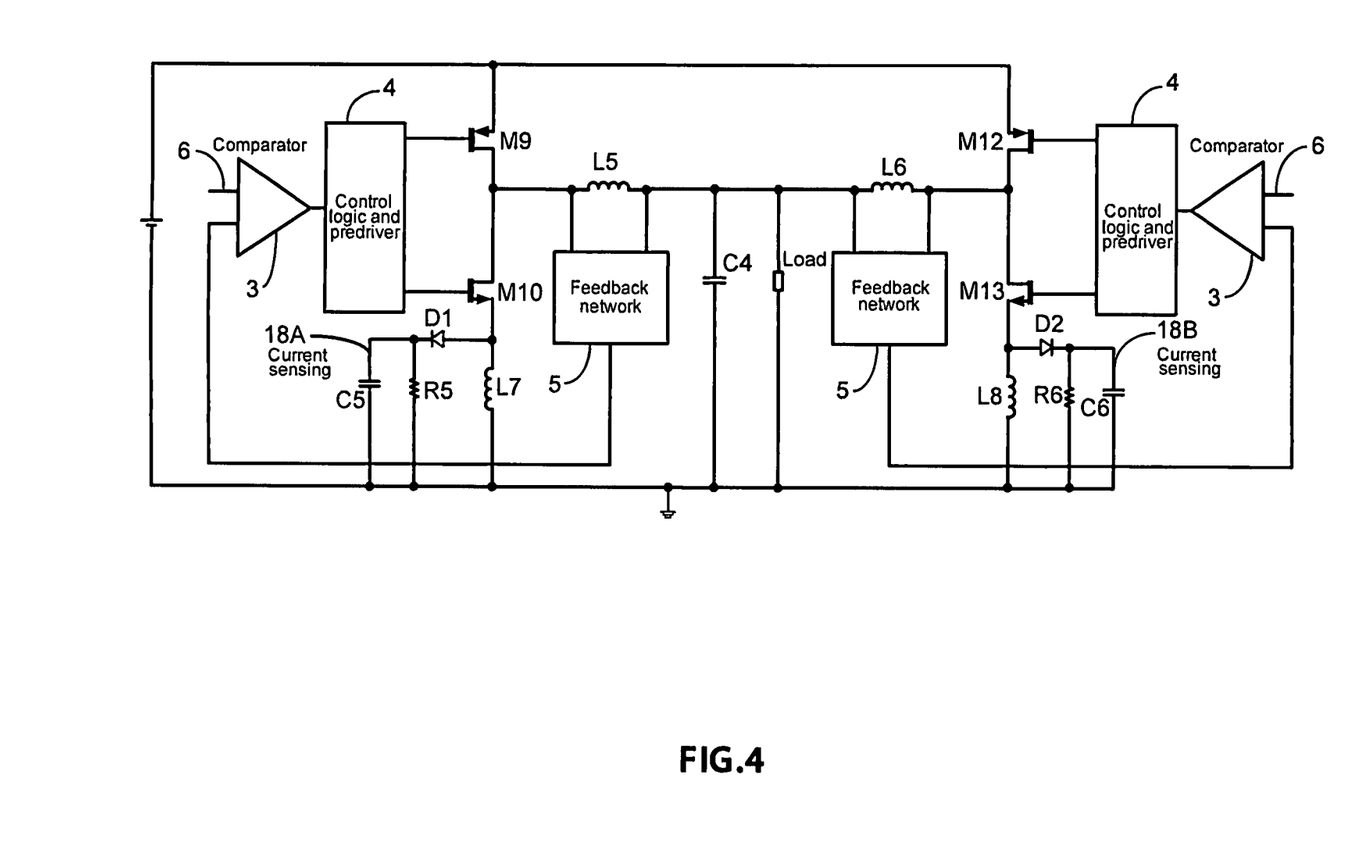
FIG. 4 shows a schematic of a dual phase hysteretic switching power converter with current sensing using small inductances and envelope detectors according to a further embodiment of the present invention.

A better current sensing solution is shown in FIG. 4 for the same type of dual phase power converter. In this case the sensing of the current is obtained by adding a small inductance (L7 for the phase to the left of the schematic) in series to the low side power transistor M10, a diode D1, a resistor R5 and a capacitor C5. The value of the inductance may be quite small or in the order of a few hundreds of pH (pico-Henry). This can be easily obtained by a small metallization to couple the low side power transistor to the ground connection in the integrated circuit. This inductance is typically present and often undesired, even though the envelope signal is not generally generated or considered.

When the transistor M10 turns off the voltage across the inductance L7 has a positive spike proportional to the inductance L7 and to the change of current in the time interval (di/dt). It is plausible to assume that the turning off time is the same between the phases, and that the mismatch of the small inductances between the phases is very much contained as well since it is mainly linked to the geometrical shape of the metallization between the low side power transistor and the ground connection. The diode D1, R5 and C5 capture the envelope of this over-voltages at the transistor turn off transitions so that the signal at the points 18A and 18B is representative of the current in the converter phase during the re-circulation.

One of the advantages of this solution is that it is very cost effective. Furthermore, since the voltage at the nodes 18A and 18B depends on the value of current, the common mode range may be adjusted so as to minimize the effect of the offsets during the adjustment of the duty cycle. The common mode range in the case of the voltage drop across the low side power transistor is in the order of a few hundred of mV, but in this case it can be in the order of 1V or higher depending on the value of the inductance L7. The inductance L7 has its own parasitic resistance but it is very small and in most cases unavoidable.

Figure 5:
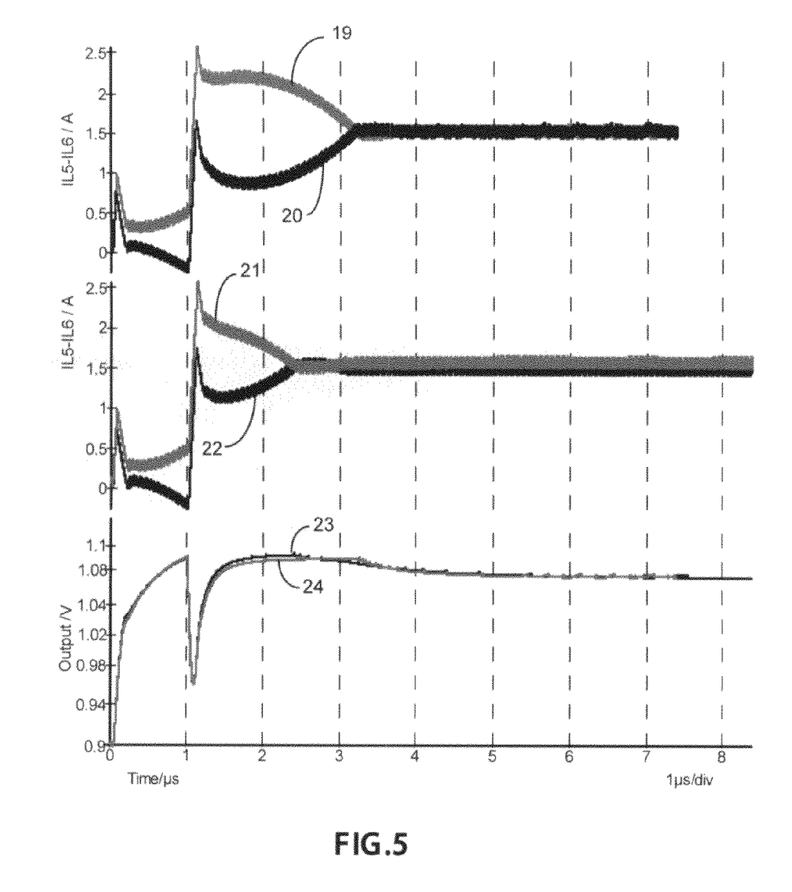
FIG. 5 shows the waveforms of the most significant voltages and currents as result of the circuit simulation of the dual phase buck converter of FIG. 4.

In this case the current is not affected by the mismatch in on-resistance of the power devices and this can be seen in FIG. 5. FIG. 5 shows that waveforms from the simulation of the circuit of FIG. 5 for the same cases of the simulation of FIG. 3. The switching frequency was 40 MHz, the value of the series sensing inductances was 200 pH, the load transient was from a 200 mA to 3 A. The switching of the two phases was misaligned by 180 degrees. The waveforms 19 and 20 show the currents in the phases with a mismatch of 200 mΩ in the series resistance of the inductors, the waveforms 21 and 22 show the currents with a mismatch of 20% for the on-resistance of the low side power transistors.

It can be noted that in this case the currents get balanced rather quickly even if a large on-resistance mismatch is present. The small error that the simulation shows is due to numerical inaccuracies with the simulator occurring because of large switching events occurring concurrently in the phases. The waveforms 23 and 24 show the output voltage of the power converter in the two cases.

So far the current sensing proposed techniques have been addressed with their advantages and drawbacks. The current sharing is generally implemented by somewhat adjusting the duty cycle of one phase with respect to the others so as to affect the current in that particular phase. This can be obtained in many ways and generally it is achieved by digital circuits. However digital systems are limited in their bandwidth due to the data conversion constraints.

Figure 6:
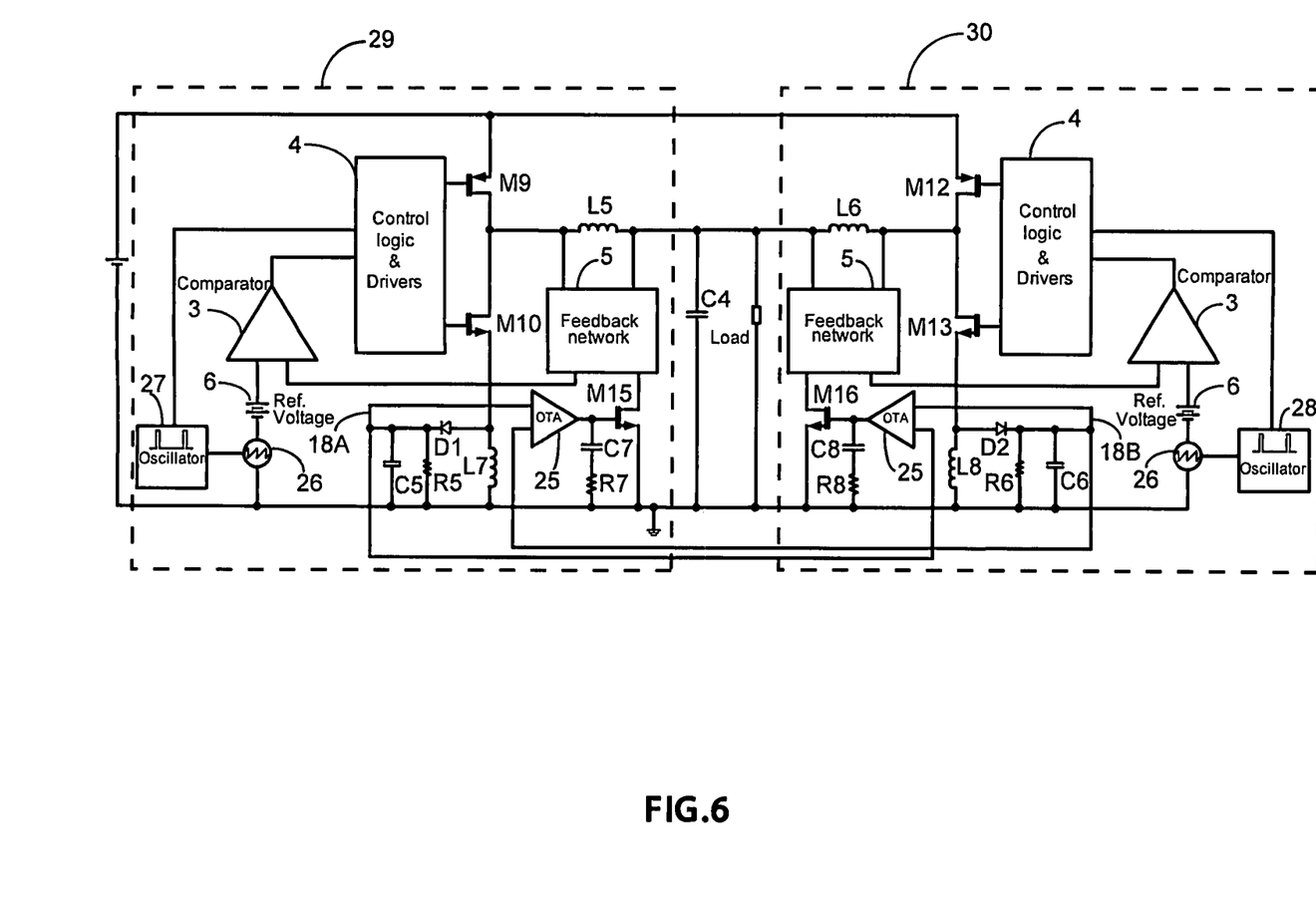
FIG. 6 shows a more complete schematic of a dual phase buck switching power converter with current sensing and current balancing circuitry according to the preferred embodiment of the present invention.

The method herein proposed envisions separate control for each phase and adjustment of the duty cycle of one phase by drawing current from a specific node of the feedback network that generates the synthetic ripple for that phase. The proposed embodiment, which also represents the preferred embodiment of the present invention, is depicted in FIG. 6. Again references are made to the phase 29 of the dual power converter of FIG. 6, knowing that similar considerations can be made for the other phase or for converters with more than two phases.

The signals 18A and 18B are fed to an input of an operational transconductance amplifier (OTA) 25. The OTA 25 amplifies the difference between the two signals 18A and 18B representing the phase currents and generates a current proportional to the differential signal. The output of the OTA 25 is filtered by the RC network C7 and R7, and drives the gate of the transistor M15. The transistor M15 draws current from a specific node of the feedback network 5 in order to slightly alter the duty cycle of the corresponding phase without significantly affecting the voltage regulation point.

The system described in FIG. 6 is not representing a hysteretic approach, but rather a minimum on-time (or minimum off-time) type of control where an oscillator sets the switching frequency of the converter by forcing the minimum on- or off-time and where the same frequency generates a ramp signal to be summed to a reference voltage. This ramp signal summed to the reference voltage is then compared to the synthetic ripple signal from the feedback network 5 by means of comparator 3. The output of the comparator is fed to the control logic and driver block 4 to generate the drive signals for the power devices.

The advantage of this system and this type of control is that the load transient response is very similar to the one of the hysteretic approach but the power converter operates at a fixed switching frequency making the extension to a multi-phase system much easier to implement since the oscillator for each phase is easily moved out of phase by any amount.

Furthermore this approach of having individual control for the phases only apparently makes the integration larger in silicon area because the overall complexity of the control block is much simplified. In addition the parallel processing of the information allows a much larger bandwidth and therefore faster response to the load transient. Of course the implementation shown in FIG. 6 is easily extendable to higher number of phases.

It should also be noticed that drawing the current from the feedback network can vary the duty cycle only in one direction. Specifically each signal can only increase the inductor current in the corresponding phase. This approach is particularly advantageous in the case of a dual power converter, because the increase of the current in one phase automatically implies the decrease of the current in the other phase in a differential way. In the case of multiple phases the approach is a bit more complicated. In a case of a 4 phase converter where the phases can be named A, B, C and D one could use four OTAs whose input pairs are respectively A and B, B and C, C and D, and D and A, and for each OTA the current in the correspondent phase can be increased if one of the input is lower than the other.

The process of balancing for the four phases is continuous and concurrent and therefore quite fast to achieve the final result of complete current balancing. If the load is decreased to a point where only 2 or 3 phases are left operating, then some of the inputs of the OTAs should be multiplexed for the specific case. However the described method of drawing current from the feedback network in order to slightly increase the duty cycle of the corresponding phase can be modified to draw or sink current in order to adjust the duty cycle in both directions without substantially affect the scope of the present invention. Or the selection of the differential signals to input the OTAs can be implemented in many other ways without changing the scope of the present invention as known to anyone skilled in the art.

Figure 7:
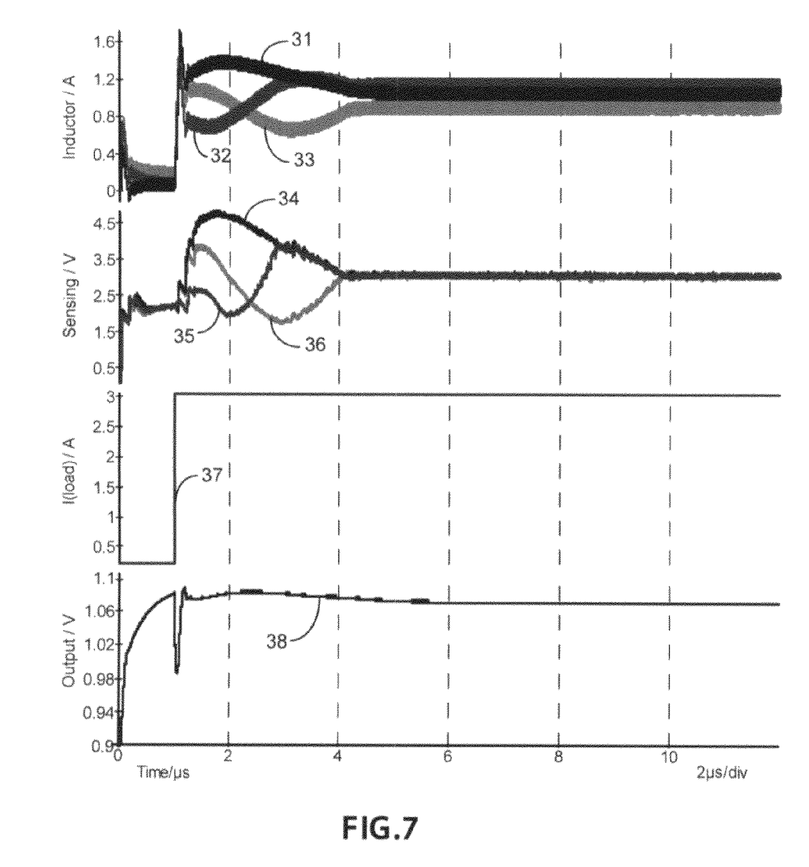
FIG. 7 shows the waveforms of the most significant voltages and currents as result of the circuit simulation of the dual phase buck converter with active current balancing of FIG. 6.

FIG. 7 shows the simulated results for the circuit of FIG. 6 extended to three phases. In this simulation the three phase converter was operating at 40 MHz with three different series resistance for the main inductors. Phase 1 had an ESR of 0Ω, phase 2 had an ESR of 300 mΩ and phase 3 had an ESR of 100 mΩ. The inductances used for current sensing were 500 pH in value. The main inductors were 200 nH in value. Waveforms 31, 32 and 33 represent the currents in the three phases. It can be noted that they are not perfectly aligned, but that is simply due to numerical inaccuracies of the simulator since many switching events were concurring and affecting each other during convergence.

However it clearly shows that despite the large mismatch in series resistance of the main inductors, the currents were equalized. Waveforms 34, 35 and 36 represent the current sensing signal 18 also indicating good balancing between the currents. Waveform 37 represents the load current with a load transient from 200 mA to 3 A occurring in 1 ns. Finally the waveform 38 represents the output voltage of the power converter.

The main use of multi-phase power converters is for high current loads, and in modern portable devices the load is typically a microprocessor or a high current consumption integrated circuit. These loads require high currents but more importantly they require very good load transient response because the integrated circuit that is powered by the converter switches very quickly from one function to another varying the load very abruptly from light loads to very heavy loads. The multi-phase converters offer the advantage of concurrent contribution to the load by all the phases improving substantially the response but a more controlled means for adjusting the duty cycle during load transient is important.

The present invention describes a method to obtain optimum load transient response for step down power converters in general, but in particular the approach is very advantageous to multi-phase power converters. The load transient response is particularly critical when the load changes very quickly from low current to very high current, since the opposite case is mainly characterized by the ability of the output capacitor to absorb the residual energy in the inductors. For the transition from low load current to high load current the objective is to be able to respond as quickly as possible in order to minimize the output voltage droop with the minimum output capacitor.

The switching frequency is very important because the inductance value of the main inductors is proportional to the frequency. The higher the frequency the smaller the inductance, and hence the faster the current rise in the phases. The optimum load transient response for a buck power converter, is defined by the application of maximum duty cycle as swiftly as possible until the inductor current has reached the load current. The best that the converter can do is to fully turn on the high side power transistor and keep it on until the energy in the main inductor has risen to the desired value.

The main loop of the converter can be modified in order to interrupt the regular switching pattern in presence of an extraordinary event, and to keep the high side power transistor fully on until a signal determines the end of the event. The event is the load transient. During the load transient the output voltage droops and so does the synthetic ripple signal. So by computing the derivative of the synthetic ripple signal, the duty cycle can be forced to be 100% when the derivative becomes negative and the regular operation of the main loop can be restored when the derivative signal nulls.

Figure 8:
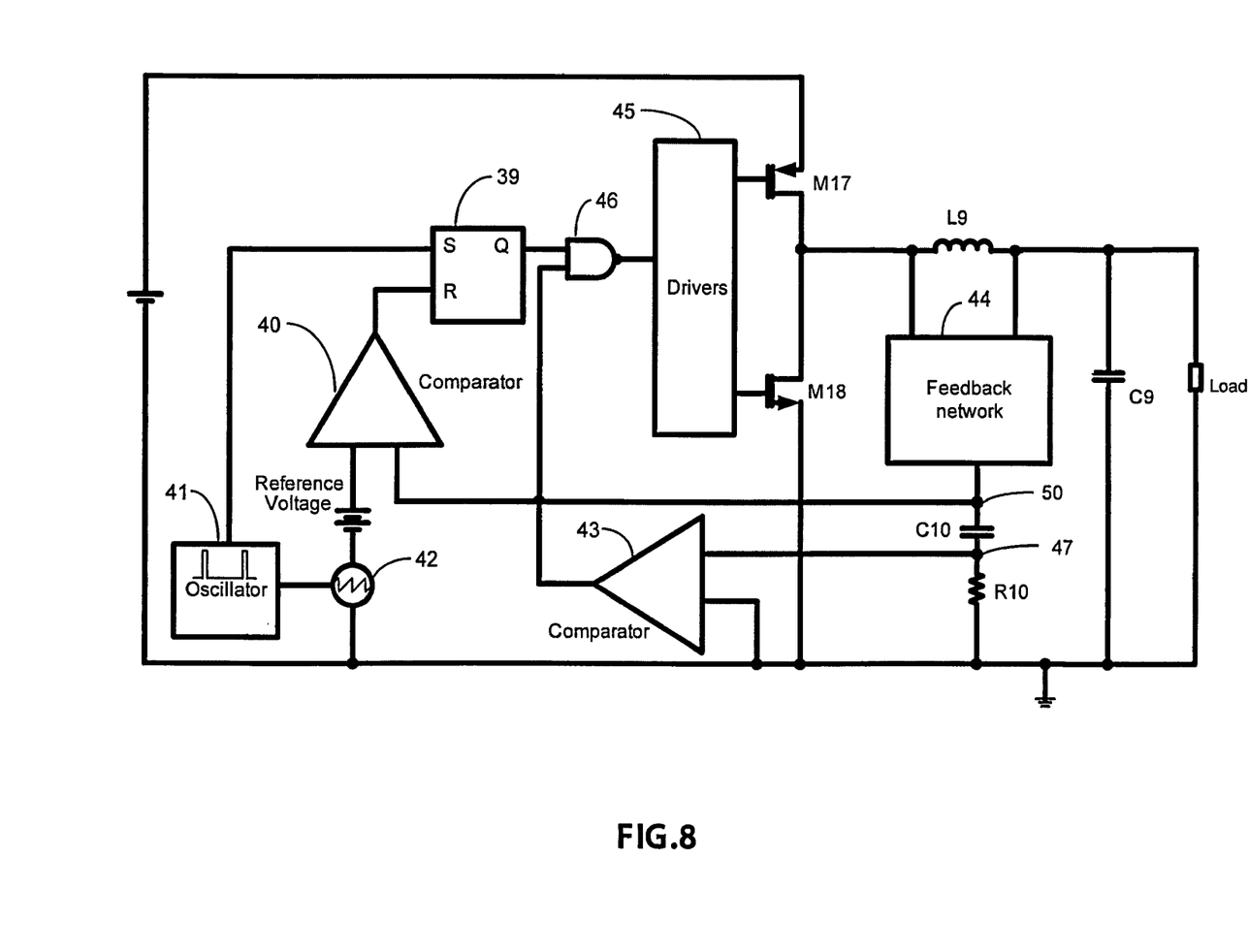
FIG. 8 shows the schematic of a fixed frequency minimum on-time single phase buck converter with optimum load transient response circuit.

The derivative of the synthetic ripple signal can be obtained by coupling a series RC network to the synthetic ripple signal as in FIG. 8. The voltage of the node 47 between the capacitor C10 and the resistor R10 is representative of the derivative of the synthetic ripple signal at node 50. The comparator 43 compares the derivative of the synthetic ripple signal with the ground signal (zero Volts threshold) and its output feeds the NAND gate 46 to bypass the signal from the Flip Flop 39 to force the duty cycle to 100% when the output of the comparator 43 is zero. The threshold of the comparator is zero but it could be chosen to be a different value as the scope of the present invention does not change as it is obvious to anyone skilled in the art.

The single phase converter depicted in FIG. 8 is a minimum on-time fixed frequency converter that makes use of the synthetic ripple signal similarly to what is used in hysteretic power converters, but what has been described for the signal representative of the derivative of the synthetic ripple signal can be extended to the derivative of the output voltage obtaining an equivalent result. In that case an RC network can be coupled directly to the output terminal of the power converter without changing the scope of the present invention.

However the comparator of FIG. 8 has to be very fast in order to allow a very rapid response. Furthermore by forcing the duty cycle to be 100% until the inductor current has reached the load current, the recovery of the output voltage from the momentary droop is not taken into account. It is best if the duty cycle is maintained at 100% until the current has reached a value slightly higher than the load current so as to allow the complete and fast recovery of the energy in the output capacitor.

Figure 9:
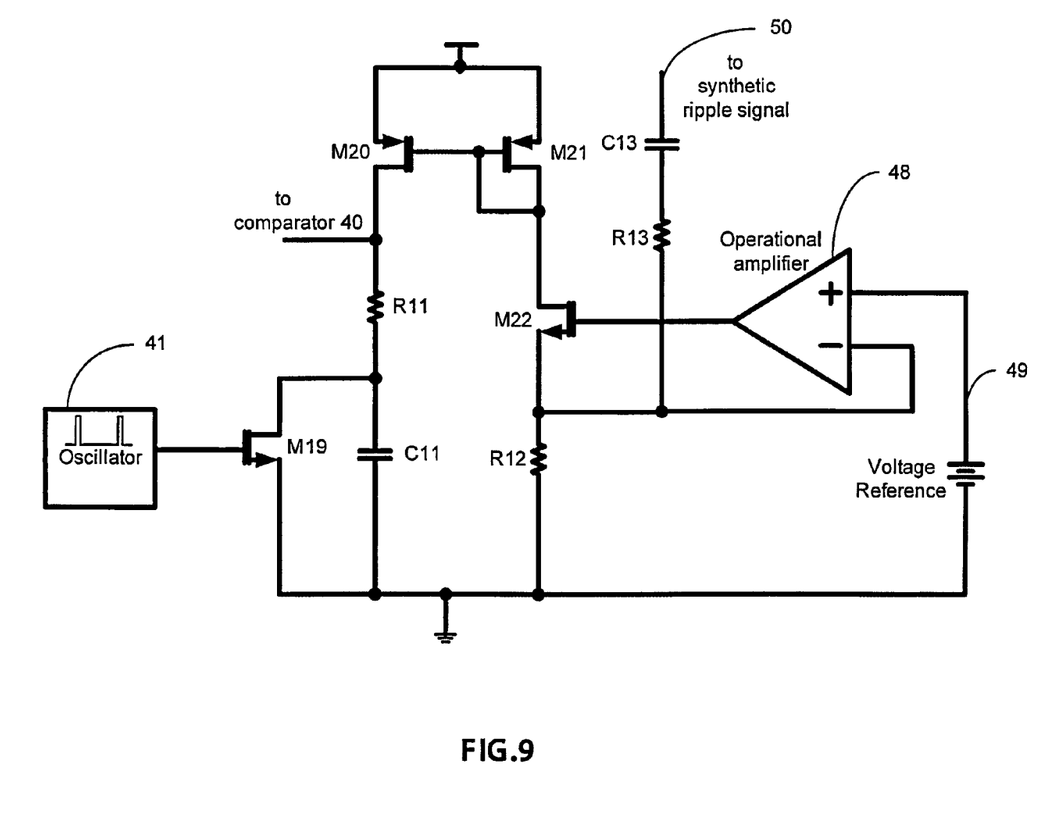
FIG. 9 shows the schematic of the ramp generation circuitry of FIG. 8 with a further embodiment for the optimum load transient response circuit.

The drawing of FIG. 9 shows an alternative implementation of optimum load transient response to achieve faster recovery. FIG. 9 shows the detailed component implementation of the ramp generator 42 of FIG. 8 with the summing of the reference voltage to obtain the signal to be compared by the comparator 40 with the synthetic ripple signal. The voltage reference 49 is replicated across the resistor R12 by the operational amplifier 48 and the MOS transistor M22. The generated current is mirrored onto the resistor R11. The oscillator 41 toggles the transistor M19 to discharge the capacitor C11 at the desired frequency.

If the mirror formed by the transistors M20 and M21 has an area ratio of 1:1 and if the resistor R11 has the same value of the resistor R12, the voltage reference is reported across the resistor R11. The voltage across the capacitor C11 has a ramp waveform. The signal that feeds the comparator 40 is therefore representing the sum of the ramp signal and the reference voltage 49. The series of the resistor R13 and the capacitor C13, coupled to the synthetic ripple signal has a similar effect of lowering the DC level of the ramp signal in correspondence of a load transient.

By adjusting the values of R12, R13 and C13 the optimum load transient response can be obtained. The current into the R13-C13 RC series is increased when the synthetic ripple signal has an AC perturbation. This mechanism has the advantage of eliminating the comparator of FIG. 8, providing a very fast response and eliminating the need to by-pass the signal from the regular regulation loop since the variation of the signal into the main comparator occurs during the load transient. Furthermore the adjustment of the load transient response can be made such that the duty cycle quickly shifts to 100% until the current in the inductor is increased above the load current allowing a faster recovery of the output voltage to the regulation level.

Figure 10:
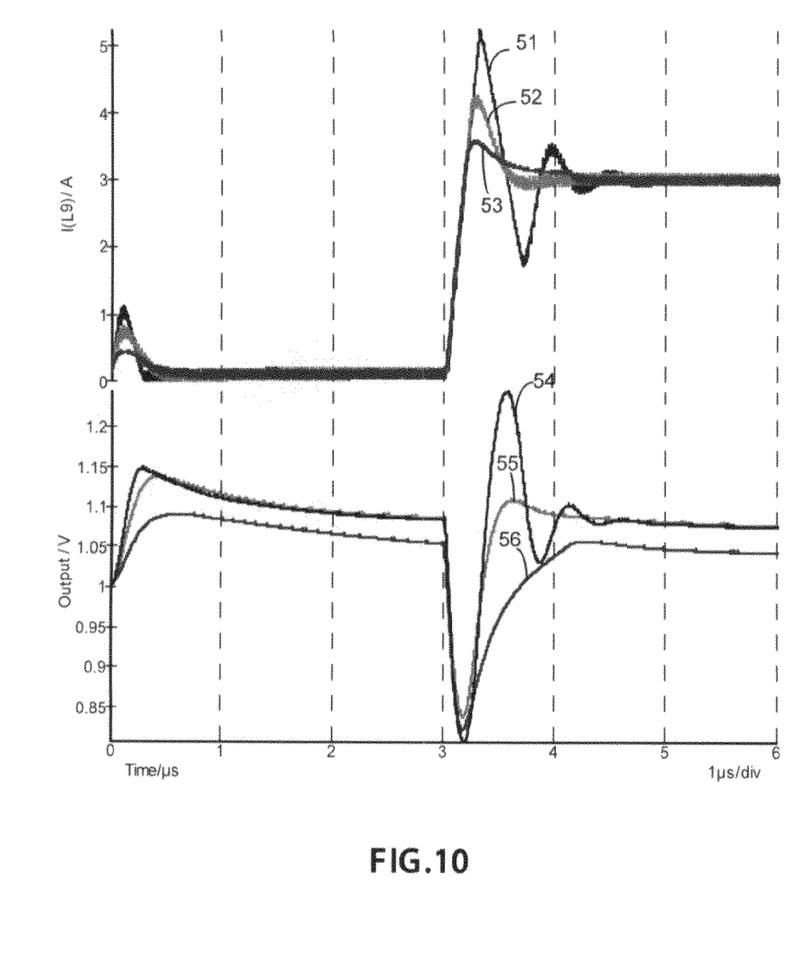
FIG. 10 shows the waveforms of the most significant voltages and currents as result of the simulation of the circuit of FIG. 8 and FIG. 9.

The waveforms of FIG. 10 show the simulated result for the step down power converter of FIG. 8 with the implementation of FIG. 9. The switching frequency was 40 MHz and the load was switched from 100 mA to 3 A. The waveforms 51 and 54 represent respectively the inductor current and the output voltage for the case of conventional power converter without any particular load transient response optimization circuit. The overshoots of the current and of the output voltage are evident. The waveforms 53 and 56 represent respectively the inductor current and the output voltage for the same converter in the same conditions with the load transient response optimization circuit of FIG. 8 where the current in the inductor raises slightly above the load current but the recovery of the output voltage to its regulation level takes much longer time.

The waveforms 52 and 55 represent respectively the inductor current and the output voltage for the same converter in the same conditions with the load transient response optimization circuit of FIG. 9 where it is evident that the inductor current raises above the load current for a short time allowing a much faster recovery of the output voltage. It should also be noted that this technique, similar to a feed-forward approach, achieves a much more stable response (higher phase margin) with higher bandwidth. Furthermore the output voltage droop is more contained. In all three cases the duty cycle is 100% immediately after the load transient as it is evidenced by the same initial rising slope of the inductor current in the three cases.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 2

The present invention describes a ripple multi-phase switching power converter that can be controlled as a hysteretic power converter or as a minimum off-time or minimum on-time fixed frequency power converter. In particular it describes a multi-phase power converter that achieves active current balancing. The current sensing is obtained in two possible ways. The first embodiment of the present invention shows the current sensing obtained by a simple sensing of the voltage drop across the low side power transistor when it is turned on.

The circuit, as depicted in FIG. 2, shows a dual phase step down power converter, but the following references to describe the functions of the converter will focus for simplicity on one phase only implying that the same exact considerations will apply to the other phase as well. Similarly the circuit of FIG. 2 describes a dual phase power converter but similar considerations can be extended to multiple phase power converters. The power converter of FIG. 2 employs a hysteretic type of control and the feedback network 5 generates the synthetic ripple signal to be compared by the comparator 3 with a reference voltage at terminal 6.

The synthetic ripple signal is a signal replica of the output voltage ripple but it is amplified to make it more immune to switching noise. Typically the feedback network is constituted of passive elements but it could include transistors as well. The circuit shows a small switch M11 that is turned on at the same time that the main power device M10 is turned on. In reality, a small delay in turning on the transistor M11 with respect to the transistor M10 and a small delay, in turning off M10 with respect to M11, are beneficial to prevent voltage spikes. The capacitor C2 holds the voltage till the next cycle.

It should be noted that the voltage across the capacitor C2 is proportional to the re-circulating current in the corresponding phase, but it does not necessarily represent the inductor current in an absolute and accurate way. However in order to obtain current sharing an absolute value of the current is not required, in fact what is needed is a consistent method to measure current with respect to the other phases of the power converter.

The presented method is simple and works quite well to correct current mismatches due to inductor series resistance mismatches, due to variations of duty cycle control between phases or even due to mismatches of the high side power transistor on-resistance, but it fails to balance the currents with accuracy in case of mismatches of the low side power transistor on-resistance. Additionally the on-resistance of the power transistor varies significantly with the temperature variations as well, even though for integrated devices the temperature of the die tends to be quite uniform with time so that the mismatch due to temperature gradient is not so pronounced or mainly present during temperature transients.

In fact if the on-resistance of the low side power transistors is not equal, since we infer the value of the current by sensing the voltage drop across the power device, any mismatch in the on-resistance will result in a mismatch in the phase currents.

B FIG. 3

This is documented in FIG. 3 which shows the simulation results for the dual phase converter of FIG. 2 switching at 40 MHz for the cases of 20% mismatch in the low side power transistors on-resistance and for the case of zero series resistance for the inductor of phase 1 and 200 mΩ series resistance for the inductor of phase 2. In particular the waveforms 12 and 13 represent the phase currents for the case of ESR (Equivalent Series Resistance) mismatch of 200 mΩ for the inductors and it can be noted that about 1 us after the load transient (from a few mA to 3 A) the two currents are equalized. The waveforms 14 and 15 represent the sensing signals across the capacitors C2 and C3 of FIG. 2 in the same case.

The waveforms 8 and 9 represent the phase currents for the case of a 20% mismatch in the on-resistance of the low side power transistors. In this case it is noted that the two currents remain different since the sensing is affected by the error in on-resistance. The waveforms 10 and 11 represent the sensing signals for this case. The waveforms 16 and 17 represent the output voltage for the two cases.

C FIG. 4

A better current sensing solution is shown in FIG. 4 for the same type of dual phase power converter. In this case the sensing of the current is obtained by adding a small inductance (L7 for the phase to the left of the schematic) in series to the low side power transistor M10, a diode D1, a resistor R5 and a capacitor C5. The value of the inductance may be quite small or in the order of a few hundreds of pH (picoHenry). This can be easily obtained by a small metallization to couple the low side power transistor to the ground connection in the integrated circuit. This inductance is typically present and often undesired, even though the envelope signal is not generally generated or considered.

When the transistor M10 turns off the voltage across the inductance L7 has a positive spike proportional to the inductance L7 and to the change of current in the time interval (di/dt). It is plausible to assume that the turning off time be the same between phases and also that the mismatch of the small inductances between the phases be very much contained as well since it is mainly linked to the geometrical shape of the metallization between the low side power transistor and the ground connection. The diode D1, R5 and C5 capture the envelope of this over-voltages at the transistor turn off transitions so that the signal at the points 18A and 18B is representative of the current in the converter phase during the re-circulation.

One of the advantages of this solution is that it is very cost effective and, in addition, that the voltage at the nodes 18A and 18B depends on the value of the current and therefore the common mode range may be adjusted so as to minimize the effect of the offsets during the adjustment of the duty cycle.

The common mode range in the case of the voltage drop across the low side power transistor is in the order of a few hundred of mV, but in this case it can be in the order of 1V or higher depending on the value of the inductance L7. The inductance L7 has its own parasitic resistance but it is very small and in most cases unavoidable.

D FIG. 5

This current is not affected by the mismatch in on-resistance of the power devices and this can be seen in FIG. 5. FIG. 5 shows that waveforms from the simulation of the circuit of FIG. 5 for the same cases of the simulation of FIG. 3. The switching frequency was 40 MHz, the value of the series sensing inductances was 200 pH, the load transient was from a 200 mA to 3 A. The switching of the two phases was misaligned by 180 degrees. The waveforms 19 and 20 show the currents in the phases with a mismatch of 200 mΩ in the series resistance of the inductors, the waveforms 21 and 22 show the currents with a mismatch of 20% for the on-resistance of the low side power transistors.

It can be noted that in this case the currents get balanced rather quickly even if a large on-resistance mismatch is present. The small error that the simulation shows is due to numerical inaccuracies with the simulator occurring because of large switching events occurring simultaneously in the phases. The waveforms 23 and 24 are showing the output voltage of the power converter in the two cases.

So far the current sensing proposed techniques have been addressed with their advantages and drawbacks. The current sharing is generally implemented by somewhat adjusting the duty cycle of one phase with respect to the others so as to affect the current in that particular phase. This can be obtained in many ways and generally it is achieved by digital circuits. However digital systems are limited in their bandwidth due to the data conversion constraints.

E FIG. 6

The herein proposed method envisions separate control for each phase and adjustment of the duty cycle of one phase by drawing current from a specific node of the feedback network that generates the synthetic ripple for that phase. The proposed embodiment, which also represents the preferred embodiment of the present invention, is depicted in FIG. 6. Again references are made to the phase 29 of the dual power converter of FIG. 6, knowing that similar considerations can be made for the other phase or for converters with more than two phases.

The signals 18A and 18B are fed to an input of an operational transconductance amplifier (OTA) 25. The OTA 25 amplifies the difference between the two signals 18A and 18B representing the phase currents and generates a current proportional to the differential signal. The output of the OTA 25 is filtered by the RC network C7 and R7, and drives the gate of the transistor M15. The transistor M15 draws current from a specific node of the feedback network 5 in order to slightly alter the duty cycle of the corresponding phase without significantly affecting the voltage regulation point.

The system described in FIG. 6 is not representing a hysteretic approach, but rather a minimum on-time (or minimum off-time) type of control where an oscillator sets the switching frequency of the converter by forcing the minimum on- or off-time and where the same frequency generates a ramp signal to be summed to a reference voltage. This ramp signal summed to the reference voltage is then compared to the synthetic ripple signal from the feedback network 5 by means of comparator 3. The output of the comparator is fed to the control logic and driver block 4 to generate the drive signals for the power devices.

The advantage of this system and this type of control is that the load transient response is very similar to the one of the hysteretic approach but the power converter operates at a fixed switching frequency making the extension to a multi-phase system much easier to implement since the oscillator for each phase is easily moved out of phase by any amount.

Furthermore this approach of having individual control for the phases only apparently makes the integration larger in silicon area because the overall complexity of the control block is much simplified. In addition the parallel processing of the information allows a much larger bandwidth and therefore faster response to the load transient. Of course the implementation shown in FIG. 6 is easily extendable to higher number of phases.

It should also be noticed that drawing the current from the feedback network can vary the duty cycle only in one direction. Specifically each signal can only increase the inductor current in the corresponding phase. This approach is particularly advantageous in the case of a dual power converter, because the increase of current in one phase automatically implies the decrease of the current in the other phase in a differential way. In the case of multiple phases the approach is a bit more complicated. In a case of a 4 phase converter where the phases can be named A, B, C and D one could use four OTAs whose input pairs are respectively A and B, B and C, C and D, and D and A, and for each OTA the current in the correspondent phase can be increased if one of the input is lower than the other.

The process of balancing for the four phases is continuous and concurrent and therefore quite fast to achieve the final result of complete current balancing. If the load is decreased to a point where only 2 or 3 phases are left operating, then some of the inputs of the OTAs should be multiplexed for the specific case. However the described method of drawing current from the feedback network in order to slightly increase the duty cycle of the corresponding phase can be modified to draw or sink current in order to adjust the duty cycle in both directions without substantially affect the scope of the present invention. Or the selection of the differential signals to input the OTAs can be implemented in many other ways without changing the scope of the present invention as known to anyone skilled in the art.

F FIG. 7

FIG. 7 shows the simulated results for the circuit of FIG. 6 extended to three phases. In this simulation the three phase converter was operating at 40 MHz with three different series resistance for the main inductors. Phase 1 had an ESR of 0Ω, phase 2 had an ESR of 300 mΩ and phase 3 had an ESR of 100 mΩ. The value of the inductances used for current sensing was 500 pH. The value of the main inductors was 200 nH. Waveforms 31, 32 and 33 represent the currents in the three phases. It can be noted that they are not perfectly aligned, but that is simply due to numerical inaccuracies of the simulator since many switching events were concurring and affecting each other during convergence.

However it clearly shows that despite the large mismatch in series resistance of the main inductors, the currents were equalized. Waveforms 34, 35 and 36 represent the current sensing signal 18 also indicating good balancing between the currents. Waveform 37 represents the load current with a load transient from 200 mA to 3 A occurring in 1 ns. Finally the waveform 38 represents the output voltage of the power converter.

G FIG. 8

The main use of multi-phase power converters is for high current loads, and in modern portable devices the load is typically a microprocessor or a high current consumption integrated circuit. These loads require high currents but more importantly they require very good load transient response because the integrated circuit that is powered by the converter switches very quickly from one function to another varying the load very abruptly from light loads to very heavy loads. The multi-phase converters offer the advantage of concurrent contribution to the load by all the phases improving substantially the response but a more controlled means for adjusting the duty cycle during load transient is important.

The present invention describes a method to obtain optimum load transient response for step down power converters in general, but in particular the approach is very advantageous to multi-phase power converters. The load transient response is particularly critical when the load changes very quickly from low current to very high current, since the opposite case is mainly characterized by the ability of the output capacitor to absorb the residual energy in the inductors. For the transition from low load current to high current the objective is to be able to respond as quickly as possible in order to minimize the output voltage droop with the minimum output capacitor.

The switching frequency is very important because the inductance value of the main inductors is proportional to the frequency. The higher the frequency the smaller the inductance, and hence the faster the current rise in the phases. The optimum load transient response for a buck power converter is defined by the application of maximum duty cycle as swiftly as possible until the inductor current has reached the load current. The best that the converter can do is to fully turn on the high side power transistor and keep it on until the energy in the main inductor has risen to the desired value.

The main loop of the converter can be modified in order to interrupt the regular switching pattern in presence of an extraordinary event, and to keep the high side power transistor fully on until a signal determines the end of the event. The event is the load transient. During the load transient the output voltage droops and so does the synthetic ripple signal. So by computing the derivative of the synthetic ripple signal, the duty cycle can be forced to be 100% when the derivative becomes negative and the regular operation of the main loop can be restored when the derivative signal nulls.

The derivative of the synthetic ripple signal can be obtained by coupling a series RC network to the synthetic ripple signal as in FIG. 8. The voltage of the node 47 between the capacitor C10 and the resistor R10 is representative of the derivative of the synthetic ripple signal at node 50. The comparator 43 compares the derivative of the synthetic ripple signal with the ground signal (zero Volts threshold) and its output feeds the NAND gate 46 to bypass the signal from the Flip Flop 39 to force the duty cycle to 100% when the output of the comparator 43 is zero. The threshold of the comparator is zero but it could be chosen to be a different value as the scope of the present invention does not change as it is obvious to anyone skilled in the art.

The single phase converter depicted in FIG. 8 is a minimum on-time fixed frequency converter that makes use of the synthetic ripple signal similarly to what is used in hysteretic power converters, but what has been described for the signal representative of the derivative of the synthetic ripple signal can be extended to the derivative of the output voltage obtaining an equivalent result. In that case, an RC network can be coupled directly to the output terminal of the power converter without changing the scope of the present invention.

However the comparator of FIG. 8 has to be very fast in order to allow a very rapid response. Furthermore by forcing the duty cycle to be 100% until the inductor current has reached the load current, the recovery of the output voltage from the momentary droop is not taken into account. It is best if the duty cycle is maintained at 100% until the current has reached a value slightly higher than the load current so as to allow the complete and fast recovery of the energy in the output capacitor.

H FIG. 9

The drawing of FIG. 9 shows an alternative implementation of optimum load transient response to achieve faster recovery. FIG. 9 shows the detailed component implementation of the ramp generator 42 of FIG. 8 with the summing of the reference voltage to obtain the signal to be compared by the comparator 40 with the synthetic ripple signal. The voltage reference 49 is replicated across the resistor R12 by the operational amplifier 48 and the MOS transistor M22. The generated current is mirrored onto the resistor R11. The oscillator 41 toggles the transistor M19 to discharge the capacitor C11 at the same frequency of the oscillator 41.

If the mirror formed by the transistors M20 and M21 has an area ratio of 1:1 and if the resistor R11 has the same value of the resistor R12, the voltage reference is reported across the resistor R11. The voltage across the capacitor C11 has a ramp waveform. The signal that feeds the comparator 40 is therefore representing the sum of the ramp signal and the reference voltage 49. The series of the resistor R13 and the capacitor C13, coupled to the synthetic ripple signal has a similar effect of lowering the DC level of the ramp signal in correspondence of a load transient.

By properly adjusting the values of R12, R13 and C13 the optimum load transient response can be obtained. The current into the R13-C13 RC series is increased when the synthetic ripple signal has an AC perturbation. This mechanism has the advantage of eliminating the comparator of FIG. 8, providing a very fast response and eliminating the need to by-pass the signal from the regular regulation loop since the variation of the signal into the main comparator occurs during the load transient. Furthermore the adjustment of the load transient response can be made such that the duty cycle quickly shifts to 100% until the current in the inductor is increased above the load current allowing a faster recovery of the output voltage to the regulation level.

I FIG. 10

The waveforms of FIG. 10 show the simulated result for the step down power converter of FIG. 8 with the implementation of FIG. 9. The switching frequency was 40 MHz and the load was switched from 100 mA to 3 A. The waveforms 51 and 54 represent respectively the inductor current and the output voltage for the case of conventional power converter without any particular load transient response optimization circuit. The overshoots of the current and of the output voltage are evident. The waveforms 53 and 56 represent respectively the inductor current and the output voltage for the same converter in the same conditions with the load transient response optimization circuit of FIG. 8 where the current in the inductor raises slightly above the load current but the recovery of the output voltage to its regulation level takes much longer time.

The waveforms 52 and 55 represent respectively the inductor current and the output voltage for the same converter in the same conditions with the load transient response optimization circuit of FIG. 9 where it is evident that the inductor current raises above the load current for a short time allowing a much faster recovery of the output voltage. It should also be noted that this technique, similar to a feed-forward approach, achieves a much more stable response (higher phase margin) with higher bandwidth. Furthermore the output voltage droop is more contained. In all three cases the duty cycle is 100% immediately after the load transient as it is evidenced by the same initial rising slope of the inductor current in the three cases.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A multi-phase switching power converter, wherein each phase is comprising:
   a feedback network;
   a main inductor;
   an amplifier;
   wherein an inductor current flows in said main inductor;
   wherein said feedback network generates a synthetic ripple signal;
   wherein said inductor current in each phase is sensed;
   wherein a voltage signal representative of said inductor current is generated;
   wherein said voltage signal representative of said inductor current is fed to said amplifier;
   wherein an output signal of said amplifier, representative of a difference between the inductor currents in two phases of said multi-phase switching power converter, is converted into a current signal;
   wherein said current signal is coupled to said feedback network, and
   whereby said current signal modulates a duty cycle of the corresponding phase of said multi-phase switching power converter to balance said inductor current with the inductor currents in the other phases of said multi-phase switching power converter.

2. The multi-phase switching power converter of claim 1, further comprising a low side power transistor in each phase, wherein said inductor current in each phase is sensed by detecting a voltage drop across said low side power transistor when said low side power transistor is turned on, and
   wherein said voltage drop is held in a capacitor in order to generate said voltage signal representative of the inductor current in said phase.

3. The multi-phase switching power converter of claim 1, further comprising a low side power transistor in each phase, wherein a small inductor is coupled to the source of said low side power transistor;
   wherein said inductor current in each phase of said multi-phase switching power converter is sensed by detecting an envelope signal of the voltage spikes generated by the switching of the current into said small inductor, and
   wherein said envelope signal is representative of said inductor current in the phase.

4. The multi-phase switching power converter of claim 1, wherein said switching power converter operates at a fixed switching frequency.

5. The multi-phase switching power converter of claim 1, wherein said switching power converter is a hysteretic multi-phase switching power converter.

6. The multi-phase switching power converter of claim 1, wherein said switching power converter is a step down power converter.

7. The multi-phase switching power converter of claim 1, wherein said switching power converter is a step up power converter.

8. A method to sense a main inductor current in a switching power converter comprising:
   coupling a small inductor to a source of a low side power transistor of said switching power converter;
   coupling an envelope detector circuit to said small inductor;

wherein a positive input terminal of said envelope detector circuit is coupled to said source of said low side power transistor and a negative input terminal of said envelope detector circuit is coupled to a negative terminal of said switching power converter;

whereby positive voltage spikes are generated at a positive terminal of said small inductor at the turn-off transitions of said low side power transistor;

wherein the amplitude of said voltage spikes is substantially proportional to a value of said small inductor, and whereby a signal representative of said main inductor current is generated at said positive output terminal of said envelope detector circuit.

9. The method of claim 8, wherein said small inductor is made of a metallization to couple said source of said low side power transistor to said negative terminal of said switching power converter.

10. The method of claim 8, wherein said switching power converter is a multi-phase switching power converter.

11. The method of claim 8, wherein said small inductor is selected to obtain appropriate amplitude of said voltage spikes depending on a range of load current for said switching power converter.

12. The method of claim 8 further comprising a voltage clamp coupled to said source of said low side power transistor to prevent circuit damage due to excessive amplitude of said voltage spikes.

13. A method for obtaining optimum load transient response in a step down switching power converter comprising:

generating a signal representative of a derivative of an output voltage of said step down switching power converter;

forcing maximum duty cycle for said step down switching power converter when said signal representative of the derivative of said output voltage is below a first threshold;

restoring a control of a duty cycle for said step down switching power converter when said signal representative of the derivative of said output voltage is above a second threshold;

whereby the inductor current of said step down switching power converter is forced to rise in the minimum time possible to substantially the same level of the load current, and whereby said output voltage of said step down switching power converter is subject to the smallest voltage droop during said load transient.

14. The method of claim 13, wherein said first and second thresholds have the same value.

15. The method of claim 13, wherein said signal representative of the derivative of the output voltage of said step down switching power converter is obtained by a series RC network coupled to an output terminal of said step down switching power converter and to a negative terminal of said step down switching power converter.

16. The method of claim 13, wherein said signal representative of the derivative of the output voltage of said step down switching power converter is obtained by a series RC network coupled to a synthetic ripple signal of said step down switching power converter and to a negative terminal of said step down switching power converter.

17. The method of claim 13, wherein said step down switching power converter is a fixed frequency ripple step down power converter;

wherein said signal representative of the derivative of the output voltage of said fixed frequency ripple step down power converter is obtained by a series RC network coupled to a synthetic ripple signal and to a reference signal of said fixed frequency ripple step down power converter;

wherein a signal representative of said reference signal is summed to a ramp signal to generate a ramp reference signal;

wherein said ramp reference signal is compared to said synthetic ripple signal to determine the duty cycle of said fixed frequency ripple step down power converter, and whereby said ramp reference signal is subject to abrupt changes during a load transient.

18. The method of claim 13, wherein said step down switching power converter is a multi-phase step down switching power converter.

19. A method to convert power by means of a multi-phase switching power converter, comprising:

coupling a feedback network to each phase of said multi-phase switching power converter;

generating a synthetic ripple signal in each feedback network;

sensing an inductor current in each phase;

generating a voltage signal representative of said inductor current;

feeding said voltage signal representative of said inductor current to an amplifier;

converting an output signal of said amplifier, representative of a difference between the inductor currents in two phases of said multi-phase switching power converter into a current signal;

coupling said current signal to said feedback network, and modulating the duty cycle of the corresponding phase of said multi-phase switching power converter with said current signal to balance said inductor current with the inductor currents in the other phases of said multi-phase switching power converter.

20. The method of claim 19, wherein said multi-phase switching power converter operates at a fixed switching frequency.

* * * * *